(12) United States Patent
Kim et al.

(10) Patent No.: US 9,504,972 B2
(45) Date of Patent: Nov. 29, 2016

(54) APPARATUS FOR PREPARING POLYMER LATEX RESIN POWDER AND METHOD OF PREPARING POLYMER LATEX RESIN POWDER USING THE SAME

(71) Applicant: LG CHEM, LTD., Seoul (KR)

(72) Inventors: Chang Sull Kim, Daejeon (KR); Min Cheol Ju, Daejeon (KR); Hyung Sub Lee, Daejeon (KR); Hoi In Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 73 days.

(21) Appl. No.: 14/367,557

(22) PCT Filed: Dec. 24, 2013

(86) PCT No.: PCT/KR2013/012119
§ 371 (c)(1),
(2) Date: Jun. 20, 2014

(87) PCT Pub. No.: WO2014/196707
PCT Pub. Date: Dec. 11, 2014

(65) Prior Publication Data
US 2015/0322255 A1 Nov. 12, 2015

(30) Foreign Application Priority Data
Jun. 3, 2013 (KR) .................. 10-2013-0063364
Dec. 20, 2013 (KR) .................. 10-2013-0159970

(51) Int. Cl.
*B01J 19/20* (2006.01)
*B01F 7/08* (2006.01)
*C08L 51/00* (2006.01)
*B01J 19/00* (2006.01)
*C08F 2/01* (2006.01)
*C08J 3/16* (2006.01)
*C08F 236/06* (2006.01)
*C08F 279/04* (2006.01)
*B01F 7/00* (2006.01)
*B01J 8/10* (2006.01)

(52) U.S. Cl.
CPC .............. *B01F 7/08* (2013.01); *B01F 7/00425* (2013.01); *B01J 8/10* (2013.01); *B01J 19/0066* (2013.01); *B01J 19/20* (2013.01); *C08F 2/01* (2013.01); *C08F 236/06* (2013.01); *C08F 279/04* (2013.01); *C08J 3/16* (2013.01); *C08L 51/003* (2013.01); *B01J 2208/0084* (2013.01); *B01J 2208/00371* (2013.01); *B01J 2208/00867* (2013.01); *B01J 2219/00761* (2013.01); *B01J 2219/182* (2013.01); *C08J 2351/04* (2013.01)

(58) Field of Classification Search
CPC ........ B01F 7/048; B01J 2/00; B01J 19/0066; B01J 19/20; C08L 51/003
USPC ...................................................... 524/571
See application file for complete search history.

(56) References Cited

U.S. PATENT DOCUMENTS

| 4,890,929 A | 1/1990 | Okada et al. | |
|---|---|---|---|
| 2004/0198870 A1* | 10/2004 | Sulzbach | B01F 7/00141 523/324 |

FOREIGN PATENT DOCUMENTS

| CN | 1681630 A | 10/2005 |
|---|---|---|
| CN | 102481535 A | 5/2012 |
| JP | 09071603 A | 3/1997 |
| JP | 2001294765 A | 10/2001 |
| JP | 2003292507 A | 10/2003 |
| JP | 2007332202 A | 12/2007 |
| JP | 2013501821 A | 1/2013 |
| KR | 1020030023389 | 3/2003 |
| KR | 1020090084332 | 8/2009 |
| KR | 1020110015074 | 2/2011 |
| WO | WO2011/016625 | * 2/2011 |
| WO | 2011138438 | 11/2011 |

* cited by examiner

*Primary Examiner* — James J Seidleck
*Assistant Examiner* — Deve E Valdez
(74) *Attorney, Agent, or Firm* — Dentons US LLP

(57) ABSTRACT

Disclosed are an apparatus for preparing a polymer latex resin powder in which an efficiency of mixing of steam, a latex, and a coagulant is increased by introducing a non-continuous screw into a reactor that performs coagulation and aging and thus a moisture content of a slurry is decreased and, accordingly, drying efficiency may be enhanced, and a polymer latex resin powder with excellent color and powder characteristics may be prepared using a decreased amount of coagulant and a method of preparing a polymer latex resin powder by using the same.

11 Claims, 3 Drawing Sheets

APPARATUS FOR PREPARING POLYMER LATEX RESIN POWDER AND METHOD OF PREPARING POLYMER LATEX RESIN POWDER USING THE SAME

This application is a 35 USC §371 National Stage entry of International Application No. PCT/KR2013/012119, filed on Dec. 24, 2013, which claims priority from Korean Patent Application Nos. 10-2013-0063364, filed on Jun. 3, 2013 and 10-2013-0159970, filed on Dec. 20, 2013, in the Korean Intellectual Property Office, all of which are incorporated herein by reference in its entirety.

TECHNICAL FIELD

The present invention relates to an apparatus for preparing a polymer latex resin powder and a method of preparing a polymer latex resin powder using the same, and more particularly to an apparatus for preparing a polymer latex resin powder which includes a latex tank, a coagulation bath, an aging bath, a dehydrator, and a dryer, in which an efficiency of mixing of steam, a latex, and a coagulant is increased by introducing a non-continuous screw into a reactor that performs coagulation and aging and thus a moisture content of a slurry is decreased and, accordingly, drying efficiency may be enhanced, and a polymer latex resin powder with excellent color and powder characteristics may be prepared using a decreased amount of coagulant and a method of preparing a polymer latex resin powder by using the same.

BACKGROUND ART

Polymer materials formed by emulsion polymerization may be processed into powder in order for reduction in volume, a variety of applications, and easy handling. To obtain polymer materials formed by emulsion polymerization into powder, latexes formed by emulsion polymerization require coagulation, dehydration, and drying.

Coagulation of an emulsion-polymerized polymer latex may be performed by breaking stability of latex particles stabilized by an emulsifying agent added during emulsion polymerization by a chemical method using various coagulants or by a mechanical method using mechanical force through application of strong shear stress. In the chemical method, stability is broken using different coagulants according to kinds of emulsifying agents used to secure stability of latexes. In the mechanical method, strong shear stress is applied to latex so that latex particles agglomerate with each other by overcoming repulsive force between emulsifying agents.

As a method of preparing a polymer latex powder, rapid coagulation is proposed. Rapid coagulation is a process whereby polymer particles in a latex rapidly agglomerate with each other by breaking stability of an emulsifying agent through addition of an excess of an aqueous solution of a coagulant such as an inorganic salt, an acid, or the like. Such agglomeration of polymer particles of a latex is referred to as coagulation, and a suspension of these agglomerated polymer particles is referred to as a slurry. The polymer particles are physically weakly combined with each other and thus are easily broken up by external shear stress using a stirrer or the like. Thus, primarily coagulated slurry is subjected to aging whereby binding capacity is enhanced by chain crosslinking through temperature increase. The resulting slurry is subjected to dehydration and drying, thereby completing preparation of a powder-type polymer latex.

In rapid coagulation in which coagulation is performed using an excess of a coagulant, latex stability is very rapidly broken and thus coagulation of polymer latex particles occurs very fast and irregularly. Due to such irregular coagulation, apparent specific gravity is reduced and particle size distribution of finally obtained particles is very wide.

FIG. 1 is a view illustrating a conventional apparatus for preparing a polymer latex resin powder. The apparatus includes a latex storage tank 1, a coagulation bath 2, an aging bath 3, a dehydrator 4, and a dryer 5.

First, a polymer latex stored in the latex storage tank 1 is introduced into the coagulation bath 2 via a polymer latex introduction line 11, and an aqueous coagulant solution and water for adjustment of the concentration of solid content are added to the polymer latex in the coagulation bath 2 via a coagulant introduction line 12 and a water supply line 13, respectively. The added aqueous coagulant solution serves to break electrostatic stabilization obtained by an emulsifying agent and thus enables polymer particles in a latex to agglomerate with each other, thereby obtaining a polymer slurry. The coagulated polymer slurry is transferred to the aging bath 3 and then subjected to aging at high temperature for a residence time of 40 to 90 minutes. The finally obtained slurry is subjected to dehydration in the dehydrator 4 and dried in the dryer 5 to obtain a polymer powder, and the polymer powder is discharged via a polymer powder discharge line 15. A coagulant added to the dehydrator 4 is discharged via a coagulant discharge line 14.

However, when such an apparatus is used, it is difficult to stir and transfer a slurry with high viscosity and thus efficiency of processing into powder is deteriorated. Thus, it is difficult to use a slurry with high solid content in order to increase dehydration and/or drying efficiency and thus only a slurry with low solid content may be used in the apparatus and, accordingly, subsequent dehydration and drying processes are time-consuming and require much effort and energy.

To address the problems described above, a multi-step continuous coagulation and aging process is proposed. This process is advantageous in that a polymer slurry with low solid content may be effectively aged. However, this process cannot be applied to a slurry with high solid content and requires several steps, which results in somewhat low manufacturing efficiency.

In addition, slow coagulation whereby powder characteristics of finally obtained particles are enhanced by adjusting a coagulation rate through divisional introduction of a coagulant is proposed. In this process, coagulation occurs in a secondary well region having energy barrier and thus a coagulation rate is slow and there is a space for rearrangement of particles and, as a result, it is possible to prepare spherical particles by regular filling. However, a total amount of a coagulant used is similar to that used in rapid coagulation and only a difference between slow coagulation and rapid coagulation is that slow coagulation is performed through divisional introduction of a coagulant. Thus, production of waste water due to an excess of a coagulant is inevitable and a smaller amount of a coagulant than that used in rapid coagulation is introduced into a primary coagulation bath and thus the viscosity of a slurry is increased and, accordingly, water needs to be added more than in rapid coagulation in order to secure fluidity. In addition, slow coagulation requires higher moisture content than rapid coagulation.

In both rapid coagulation and slow coagulation, fluidity of a polymer latex slurry prepared after coagulation is affected by solid content, particle size distribution of the slurry, the amount of occluded water of the slurry, and the like and, in particular, largely affected by solid content. When the solid content of the slurry is a certain degree or more, the fluidity of the slurry is dramatically deteriorated and thus the slurry forms a lump and, accordingly, apparatus operation is impossible. Thus, to achieve smooth fluidity of the slurry, an excess of water needs to be further added in coagulation. Addition of water in an excessive amount increases energy cost generated when the slurry is raised to coagulation temperature and aging temperature and causes production of an excess of waste water even in a dehydration process, leading to increased post-treatment costs. In addition, it is impossible to directly use steam and steam is condensed into water as a medium to transmit energy to the slurry, which results in reduced efficiency.

As another method of recovering powder from emulsion-polymerized latex, a method of recovering a polymer latex powder using a gas-phase spray system is used. This method is a process in which a polymer latex with high solid content is sprayed onto a surface on which an excess of a coagulant flows using an atomizer to coagulate the polymer latex and the coagulated polymer latex is recovered into powder. In this case, the polymer latex contacts the coagulant while maintaining high solid content and thus is rapidly coagulated upon contacting the coagulant and, accordingly, high apparent specific gravity is obtained and it is possible to recover spherical powder that may be obtained in slow coagulation. However, an excess of a coagulant has to be used for complete reaction and thus generation of wastewater in an excessive amount is inevitable and clogging of an atomizer frequently occurs, which results in low stability of manufacturing processes.

In addition, there are studies regarding adjustment of a particle size of a powder in the presence of an organic solvent and improved apparent specific gravity, but the powder characteristics as described above may be obtained only when excess organic solvent is used.

As another method, there is shear coagulation in which a slurry is prepared by agglomerating particles in a latex through application of shear stress as strong mechanical force. This method does not require a coagulant and, in shear coagulation, a polymer latex slurry is prepared by applying shear stress by high-speed rotation of 4,000 rpm or more. However, in an emulsion-polymerized polymer latex that secures stability due to use of an emulsifying agent, the emulsifying agent remains in the recovered powder, which adversely affects thermal stability and color in processing.

Therefore, there is still a need to develop an apparatus for preparing a polymer latex resin powder, in which drying efficiency may be enhanced by reducing a moisture content of a slurry and a polymer latex resin powder having excellent color and powder characteristics may be prepared by reducing the amount of a coagulant and a method of preparing a polymer latex resin powder using the same.

DISCLOSURE

Technical Problem

Therefore, the present invention has been made in view of the above problems, and it is an object of the present invention to provide an apparatus for preparing a polymer latex resin powder, in which an efficiency of mixing of steam, a latex, and a coagulant is increased by introducing a non-continuous screw into a reactor that performs coagulation and aging and thus a moisture content of a slurry is decreased and, accordingly, drying efficiency may be enhanced, and a polymer latex resin powder with excellent color and powder characteristics may be prepared using a decreased amount of coagulant and a method of preparing a polymer latex resin powder using the apparatus described above.

The objects of the present invention may be achieved by embodiments of the present invention described below.

Technical Solution

In accordance with an aspect of the present invention, the above and other objects can be accomplished by the provision of an apparatus for preparing a polymer latex resin powder including a reactor for coagulation of a polymer latex, in which the reactor includes a hollow reaction tube through which a latex passes, at least one barrel pin protruding from an inner wall of the reaction tube to an inner side of the reaction tube, a rotating shaft extending along a central axis in a longitudinal direction of the reaction tube, and one or more stirrers protruding from an outer surface of the rotating shaft towards the inner wall of the reaction tube, wherein the one or more stirrers includes a non-continuous screw.

The apparatus may include at least one of a dehydrator and a dryer.

The number of the one or more stirrers may be 1 to 20.

The non-continuous screw may include one or more openings.

A total area of the one or more openings may be in a range of 0.05 to 1 with respect to a total area of rotary wings.

In the non-continuous screw, an inclination angle α of a rotary wing with respect to an axis perpendicular to the rotating shaft may be 0.1° to 10°.

The reaction tube of the reactor may include at least one barrel pin extending from an outside of the reaction tube to an inside of the reaction tube.

The reactor may include a polymer latex introduction line, a coagulant introduction line, and a steam introduction line.

The reactor may be an integrated reactor for coagulation and aging of the polymer latex.

In accordance with another aspect of the present invention, there is provided a method of preparing a polymer latex resin powder by using the apparatus described above.

The polymer latex resin powder may have a moisture content of 25% or less.

A residence time of a polymer slurry in coagulation and aging may be 0.5 minutes to 30 minutes.

A polymer resin may be a graft copolymer of vinyl cyanide compound-conjugated diene-based compound-aromatic vinyl compound.

In accordance with a further aspect of the present invention, there is provided a polymer latex resin powder prepared using the method described above.

Effects Of The Invention

According to the present invention, efficiency of mixing of a latex and a coagulant is enhanced by inducing turbulent flow of the latex through introduction of a non-continuous screw that interrupts flow of uncondensed steam and a latex fluid into a reactor that performs coagulation and aging, post-treatment processes such as dehydration, drying and the like are simplified by reducing a moisture content of a slurry and thus energy reduction effects are enhanced, and color of the obtained polymer powder is enhanced using a decreased amount of coagulant used in coagulation, which results in enhanced quality effects.

In addition, residence time of the slurry in an apparatus for preparing a polymer latex resin powder is secured by reducing volume and pressure of uncondensed steam through increase in condensing efficiency of the steam, and powder characteristics (removal of coarse particles and increase in apparent specific gravity) are enhanced by increase in the number of collisions of the slurry and thus manufacturing stability of post-processing is enhanced, energy reduction effects and obtained, and effects of reducing logistics costs such as packaging cost, transportation cost, and the like are obtained.

[Description of Reference Numerals]

Figure 1:
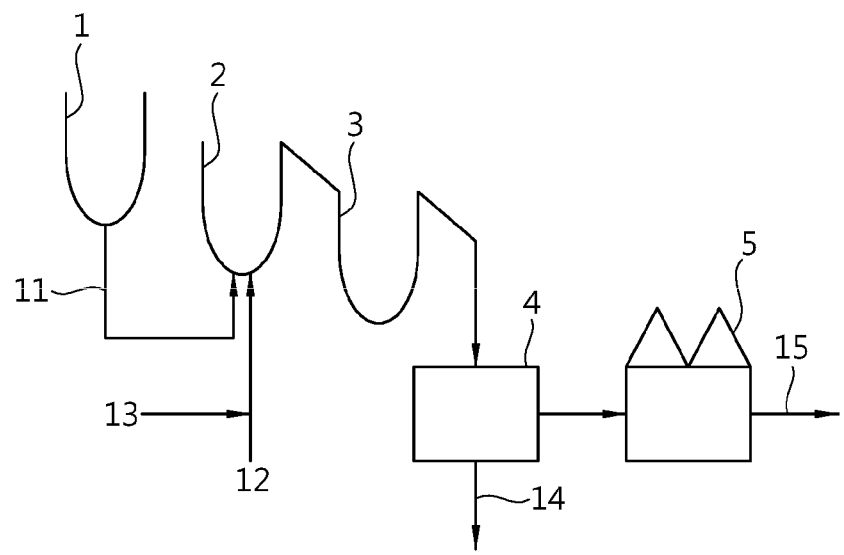
FIG. 1 is a view illustrating a structure of a conventional apparatus for preparing a polymer latex resin powder.

| | |
|---|---|
| 100: Reactor | 110, 11: Polymer latex introduction line |
| 120, 12: coagulant introduction line | |
| 130: Steam introduction line | |
| 140: Barrel pin | 150: stirrer |
| 210: Non-continuous screw | |
| 1: Latex storage tank | 2: coagulation bath |
| 3: Aging bath | 4: dehydrator |
| 5: Dryer | 13: Water supply line |
| 14: Discharge of coagulant | 15: Final polymer powder |

BEST MODE

The inventors of the present invention studied a method of efficiently preparing a polymer latex resin powder from an emulsion-polymerized latex and confirmed that an efficiency of mixing of steam, a latex, and a coagulant is increased by introducing a non-continuous screw into a reactor in which coagulation and aging are implemented unlike an existing process in which coagulation and aging are independently performed and, accordingly, a moisture content of a slurry may be reduced, which results in increased drying efficiency, and a polymer latex resin powder with excellent color and powder characteristics may be prepared using a decreased amount of coagulant.

To achieve the objects described above, as illustrated in FIG. 2, the present invention provides an apparatus for preparing a polymer latex resin powder that includes a latex tank, a reactor 100 for coagulation and aging of a latex, a dehydrator, and a dryer, wherein the reactor 100 includes a hollow reaction tube 160 through which the latex passes, at least one barrel pin 140 protruding from an inner wall of the reaction tube 160 towards an inner side of the reaction tube 160, a rotating shaft 170 extending along a central axis in a longitudinal direction of the reaction tube 160, and at least one stirrer 150 protruding from an outer surface of the rotating shaft 170 towards the inner wall of the reaction tube 160, wherein the stirrer 150 is a non-continuous screw 210.

That is, the present invention is characterized in that turbulent flow of the latex is induced by replacing at least one of a plurality of stirrers 150 in the reactor 100 for coagulation and aging of a latex with the non-continuous screw 210 and thus a mixing efficiency of the latex and a coagulant is enhanced, simplification of post-treatment processes such as dehydration, drying, and the like and enhancement of energy reduction effects are obtained using a decreased moisture content of slurry, and color of the obtained polymer powder is improved using a decreased amount of coagulant used in coagulation and thus quality enhancement effects are obtained. The reaction tube 160 may have a polygonal section or a circular section, preferably a circular section.

The stirrer may, for example, a continuous rotary wing or a continuous screw.

The reactor 100 is configured to implement coagulation and aging together and includes the hollow reaction tube 160 through which the latex passes, the barrel pin 140 protruding from the inner wall of the reaction tube 160 towards the inner side of the reaction tube 160, the rotating shaft 170 extending along a central axis in a longitudinal direction of the reaction tube 160$x$, and the stirrer 150 protruding from the outer surface of the rotating shaft 170 towards the inner wall of the reaction tube 160. A latex introduction line 110, a coagulant introduction line 120, and a steam introduction line 130 are connected to the reaction tube 160 so as to supply a latex, a coagulant, and steam to the reaction tube 160.

In a specific embodiment, the number of the non-continuous screws 210 included in the reactor 100 may be 1 to 20, preferably 4 to 16, most preferably 8 to 12. When the number of the non-continuous screws 210 is within the above-described range, flow of a fluid (uncondensed steam and latex) is hindered and turbulent flow of the latex is induced and, accordingly, increase effects in mixing efficiency of the steam, the latex, and the coagulant are obtained, but embodiments of the present invention are not limited thereto. That is, it is obvious to those of ordinary skill in the art that an appropriate number of the non-continuous screws 210 may be arranged according to the length L of the reactor 100. In addition, the non-continuous screw 210 may be a twin screw, and the non-continuous screw 210 used in the present invention is illustrated in FIGS. 3 and 4 in more detail.

Figure 2:
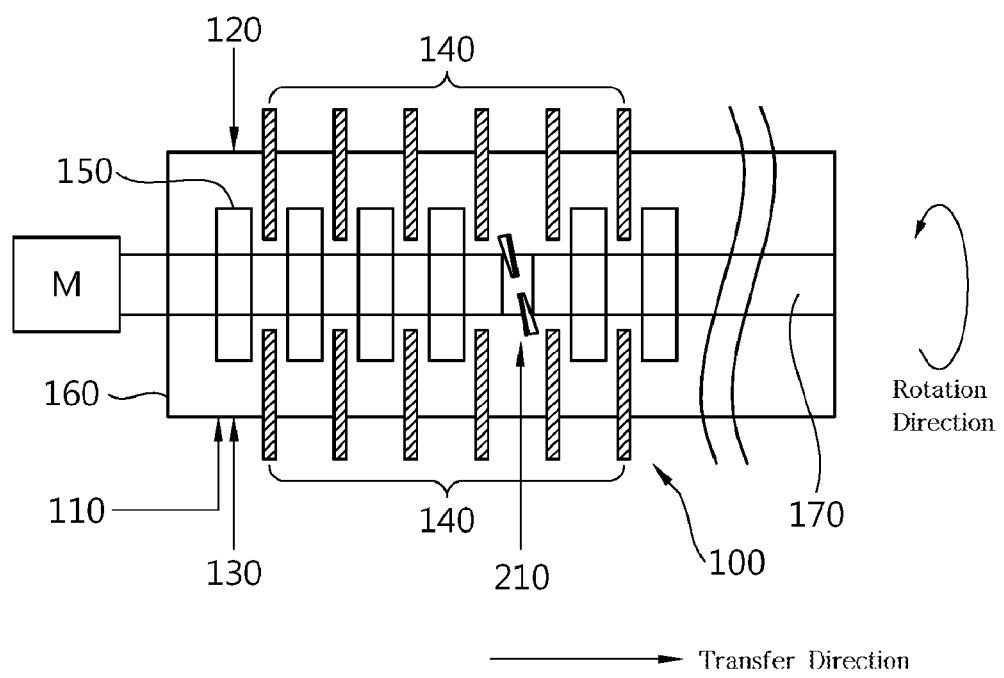
FIG. 2 is a sectional view of an apparatus for preparing a polymer latex resin powder, including a reactor to perform coagulation and aging, according to an embodiment of the present invention.
Figure 3:
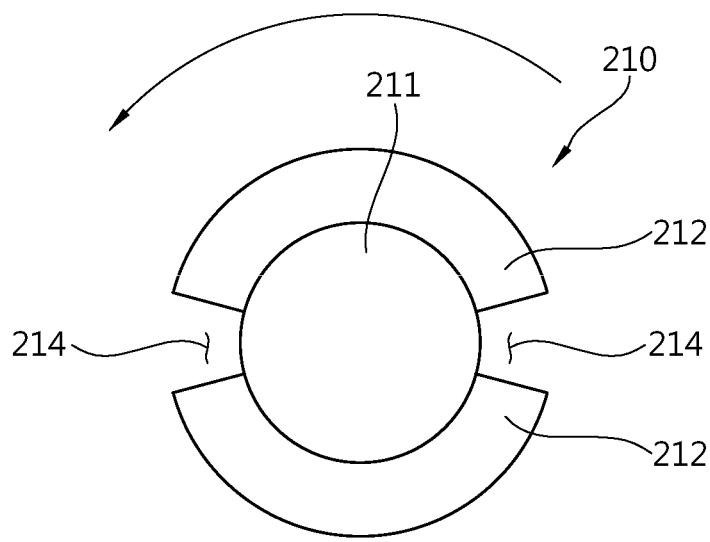
FIG. 3 is a front view illustrating an example of a non-continuous screw introduced to the reactor of FIG. 2.
Figure 4:
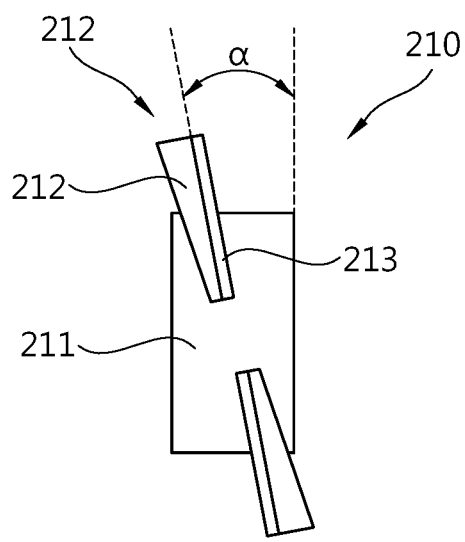
FIG. 4 is a side view of the non-continuous screw of FIG. 3.
Figure 5:
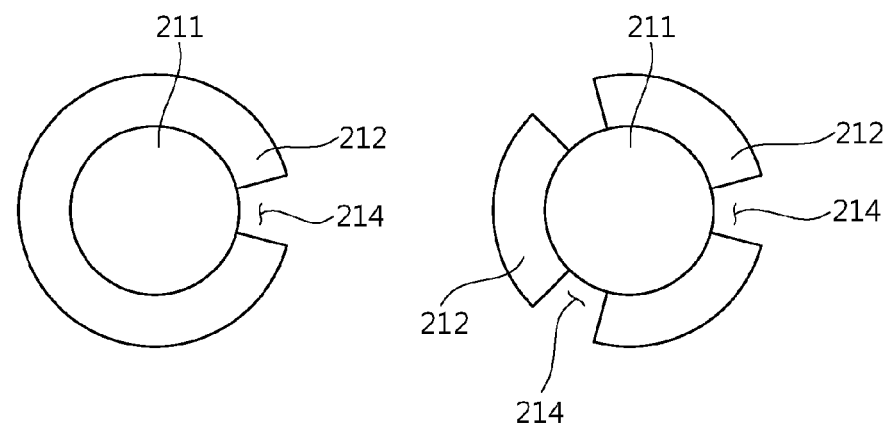
FIG. 5 illustrates front views illustrating other examples of the non-continuous screw introduced to the reactor of FIG. 2.
Figure 5:
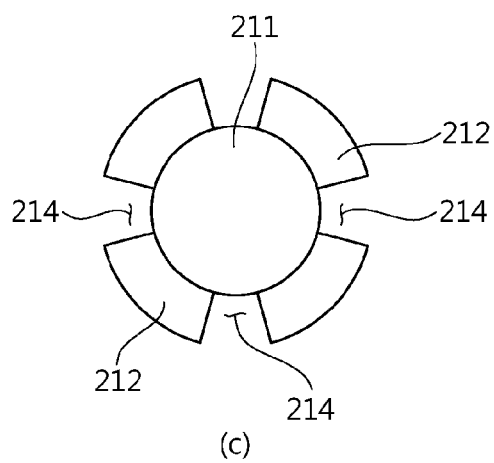

As illustrated in FIG. 3, the non-continuous screw 210 has at least one opening 214 formed by non-continuity of at least a portion of a rotary wing 212 that protrudes from an outer surface of a screw shaft 211 and spirally extends based on the screw shaft 211. The opening 214 has a structure in which the rotary wing 212 is partially not formed in a direction in which the latex transferred by rotation in a rotation direction (a rotating direction illustrated in FIG. 2, i.e., counter-clockwise based on the screw shaft 211) of the non-continuous screw 210 proceeds, i.e., in a direction extending along an axis in a longitudinal direction of the screw shaft 211. One or more openings 214 may be formed. For example, as illustrated in FIG. 5, a single opening 214 (see FIG. 5a), three openings 214 (see FIG. 5b), or four openings 214 (see FIG. 5c) may be formed and, as illustrated in FIG. 3, two openings 214 may be formed, but embodiments of the present invention are not limited thereto. That is, a greater number of openings 214 may be formed. The number of the openings 214 may be 1 to 6, preferably 1 to 5, most preferably 2 to 4. When the number of the openings 214 is within the above-described range, the flow of the fluid (uncondensed steam and latex) is hindered and the turbulent flow of the latex is induced and, accordingly, excellent increase effects in mixing efficiency of the steam, the latex, and the coagulant are obtained. The openings 214 may be formed in an even number (e.g., 2, 4, 6, or 8) rather than in an odd number (e.g., 1, 3, 5, or 7) and, in this case, less noise or vibration occurs. In FIG. 4, reference numeral 213 denotes a side surface corresponding to an end portion of the rotary wing 212.

An area ratio (i.e., a total area of the openings 214/a total area of the rotary wings 212) of the opening 214 to the non-continuous screw 210 may be 0.05 to 1, preferably 0.1 to 0.4, most preferably 0.2 to 0.3. A flow rate of the latex is appropriately maintained within the above-described range, the flow of the fluid (uncondensed steam and latex) is hindered, and the turbulent flow of the latex is induced and, accordingly, excellent increase effects in mixing efficiency of the steam, the latex, and the coagulant are obtained.

The area of the rotary wing 212 may mean the area of a surface at one side of the rotary wing 212, and the area of the opening 214 may mean the area of a surface at one side of the opening 214.

The opening 214 may mean an empty space in which the rotary wing 212 is partially not formed.

In the non-continuous screw 210, as an inclination angle $\alpha$ of the rotary wing 212 with respect to an axis perpendicular to the screw shaft 211 decreases, i.e., as the inclination angle $\alpha$ approaches 90 degrees with respect to the screw shaft 211, back pressure opposite to a transfer direction is increased and thus induces turbulent flow and, accordingly, the mixing efficiency of the steam, the latex, and the coagulant is enhanced and residence time is secured. On the other hand, when the inclination angle $\alpha$ is too small, it is difficult to transfer the latex and accumulation thereof occurs. Thus, it is important to design the rotary wing 212 by selecting an appropriate slope. A degree of inclination, i.e., the inclination angle $\alpha$, may be 0.1° to 10°, preferably 0.2° to 4°, most preferably 0.4° to 2°.

The barrel pin 140 extending from the outside to the inside of the reaction tube 160 is fixed at the reactor 100, and the stirrer 150 and/or the non-continuous screw 210 are rotatably fixed in the reaction tube 160. In particular, the reaction tube 160 of the reactor 100 includes one or more barrel pins 140 extending from the outside to the inside of the reaction tube 160. Thus, in the reaction tube 160, while the stirrer 150 and/or the non-continuous screw 210 is rotating between the barrel pins 140 fixed at the reaction tube 160, the latex introduced into the reaction tube 160 is transferred in the transfer direction of FIG. 2 and, consequently, the latex contacts the stirrer 150 and/or the rotary wings 212 of the non-continuous screw 210 and receives mechanical force therefrom and receives strong mechanical force generated by hitting the barrel pins 140 while the latex is transferred, i.e., shear stress, and stability of latexes stabilized by an emulsifying agent added during emulsion polymerization is broken by a mechanical method and thus coagulated, followed by aging at a rear part of the reaction tube 160.

The barrel pins 140 may have any shape, such as a circle, a triangle, an inclined shape, an oval, a rhombus, a tetragon, or the like, and the stirrer 150 may be a paddle stirrer, a screw stirrer, a twin-screw stirrer, a pin stirrer, or the like.

The reactor 100 including the non-continuous screw 210 may adjust the viscosity of a polymer slurry by applying mechanical force generated by action of the barrel pins 140 and the stirrer 150 and/or the non-continuous screw 210 to the latex obtained by emulsion polymerization and may adjust a moisture content using mechanical force by preparing a high viscosity slurry.

The reactor 100 includes the polymer latex introduction line 110, the coagulant introduction line 120, and the steam introduction line 130, coagulation occurs at a portion of the reactor 100 close to a position at which the polymer latex, the coagulant, and steam are introduced, and aging is performed at a rear part of the reactor 100. Thus, coagulation and aging may be substantially simultaneously performed in the same reactor.

The present invention also provides a method of preparing a polymer latex resin powder by using the apparatus described above.

A polymer latex used in the present invention is an emulsion-polymerized polymer latex having a solid content of 10 wt % to 90 wt % and may be a graft copolymer of vinyl cyanide compound-conjugated diene-based compound-aromatic vinyl compound. The graft copolymer is prepared by polymerizing a conjugated diene-based compound with a monomer mixture of an aromatic vinyl compound and a vinyl cyanide compound.

The conjugated diene-based compound may be one selected from the group consisting of butadiene-based rubber, ethylene-propylene-diene monomer (EPDM) rubber, ethylene propylene rubber (EPR), halobutyl rubber, butyl rubber, styrene-isoprene-styrene (SIS), and styrene-butadiene rubber (SBR). In particular, butadiene-based rubber is used.

The vinyl cyanide compound may be acrylonitrile, methacrylonitrile, ethacrylonitrile, or a derivative thereof, in particular acrylonitrile.

The aromatic vinyl compound may be styrene, alphamethyl styrene, alphaethyl styrene, paramethyl styrene, vinyl toluene, or a derivative thereof, in particular styrene.

As the coagulant, a water-soluble inorganic acid such as sulfuric acid, phosphoric acid, hydrochloric acid, or the like or an inorganic salt such as a sulfate or the like may be used. In general, a coagulant is added in a theoretical amount needed for coagulation or more. In the present invention, the amount of the coagulant may be 0.5 to 5 parts by weight, particularly 0.5 to 3.0 parts by weight, most particularly 0.5 to 2.0 parts by weight, based on 100 parts by weight of the polymer latex. That is, the polymer latex may be effectively coagulated using only a very small amount of the coagulant. Thus, color enhancement effects and thermal stability enhancement effects may be obtained using the coagulant in a decreased amount.

The polymer latex resin powder may have a moisture content of, for example, 25% or less, particularly 10% to 20%.

In the coagulation and aging processes, a residence time of the polymer slurry in the reactor 100 may be 0.5 to 30 minutes, for example, 0.5 to 10 minutes, for example, 0.5 to 5 minutes. In an existing apparatus, condensing efficiency of steam is so low that the residence time is not secured. In the present invention, however, the residence time may be secured by introduction of the non-continuous screw 210.

The coagulation and aging temperatures may be 60° C. to 100° C., for example, 65° C. to 85° C. When the coagulation and aging temperatures are within the above-described ranges, coagulation and aging effects are significant.

While a conventional apparatus that independently performs coagulation and aging requires a long residence time of about 30 minutes to about 1 hour, the apparatus according to the present invention includes a non-continuous screw and thus increases condensing efficiency of steam and, accordingly, a slurry with excellent powder characteristics may be prepared according to reduction in pressure difference for a very short residence time only. In the residence time, a coagulation period is completed substantially within several seconds to 1 minute, and aging is performed right after the coagulation process is completed within the above-described period of time and is continued before discharging the polymer slurry to the outside.

In the present invention, the coagulation and aging processes may be performed for a residence time of the polymer slurry of greater than 30 minutes. In this case, however, the size of the apparatus increases, which is not economical.

The solid content of the polymer latex slurry prepared using the method described above varies according to a solid content of the polymer latex, but is generally 25 wt % to 60 wt %. When the solid content of the polymer latex slurry is less than 25 wt %, fluidity of the slurry is too high and thus the residence time of the slurry cannot be secured. On the other hand, when the solid content of the polymer latex resin slurry exceeds 60 wt %, transfer of the slurry is difficult and thus the apparatus is clogged with the slurry, which stops the operation of the apparatus.

The polymer slurry having been coagulated and aged is discharged to the outside of the reactor 110 and transferred to a slurry storage tank. The coagulated and aged slurry is recovered into powder through conventional dehydration and drying processes.

Hereinafter, exemplary embodiments of the present invention will be described with reference to the following examples. However, these examples are provided for illustrative purposes only and it is obvious to one of ordinary skill in the art that various changes and modifications may be made without departing from the spirit and scope of the invention and are within the scope of the appended claims.

EXAMPLES

Example 1

As a graft copolymer latex consisting of a vinyl cyanide compound, a conjugated diene-based compound, and an aromatic vinyl compound, an acrylonitrile (AN)-butadiene (BD)-styrene (SM) copolymer latex having a ratio of 13:60:27 (AN:BD:SM) and a solid content of 44% was used.

The latex was introduced into a reactor as illustrated in FIG. 2 including eight non-continuous screws (A2/A1=0.33, α=3.60°) at a flow rate of 12 kg/hr, and diluted sulfuric acid ($H_2SO_4$) was used as a coagulant in an amount of 1.0 part by weight based on 100 parts by weight of polymer. While directly adding steam thereto, sulfuric acid mixed with water in a liquid state to correspond to the solid content of the slurry was further added to the latex, thereby setting the solid content of the polymer latex slurry to 30 wt %.

A residence time of the reactor was 1.5 minutes (average), and coagulation and aging temperature was 75° C. An aging period started immediately after coagulation and continued before discharging the slurry to the outside. The coagulated slurry is discharged to the outside via a stirrer and transferred to a slurry storage tank. The coagulated and aged slurry was subjected to dehydration and drying, thereby completing recovery of the slurry into polymer resin powder.

Example 2

A polymer resin powder was prepared in the same manner as in Example 1, except that the solid content of the polymer latex slurry was 35 wt %.

Example 3

A polymer resin powder was prepared in the same manner as in Example 1, except that the solid content of the polymer latex slurry was 44 wt %.

Example 4

A polymer resin powder was prepared in the same manner as in Example 1, except that the coagulant was added in an amount of 0.7 parts by weight based on 100 parts by weight of the polymer.

Example 5

A polymer resin powder was prepared in the same manner as in Example 1, except that the coagulant was added in an amount of 0.6 parts by weight based on 100 parts by weight of the polymer.

Comparative Example 1

As a graft copolymer latex consisting of a vinyl cyanide compound, a conjugated diene-based compound, and an aromatic vinyl compound, an AN-BD-SM copolymer latex having a ratio of 13:60:27 (AN:BD:SM) and a solid content of 44% was used.

The latex was introduced into a reactor as illustrated in FIG. 2 excluding a non-continuous screw at a flow rate of 12 kg/hr, and diluted sulfuric acid ($H_2SO_4$) was used as a coagulant in an amount of 1.0 part by weight based on 100 parts by weight of a polymer. While directly adding steam thereto, sulfuric acid mixed with water in a liquid state to correspond to the solid content of the slurry was further added to the latex, thereby setting the solid content of the polymer latex slurry to 30 wt %.

A residence time of the reactor was 1.5 minutes (average), and coagulation and aging temperature was 75° C. An aging period started immediately after coagulation and continued before discharging the slurry to the outside. The coagulated slurry is discharged to the outside via a stirrer and transferred to a slurry storage tank. The coagulated and aged slurry was subjected to dehydration and drying, thereby completing recovery of the slurry into polymer resin powder.

Comparative Example 2

A polymer resin powder was prepared in the same manner as in Comparative Example 1, except that the solid content of the polymer latex slurry was 35%.

Comparative Example 3

A polymer resin powder was prepared in the same manner as in Comparative Example 1, except that the solid content of the polymer latex slurry was 44%.

Comparative Example 4

A polymer resin powder was prepared in the same manner as in Comparative Example 1, except that the coagulant was added in an amount of 0.7 parts by weight based on 100 parts by weight of the polymer.

Comparative Example 5

A polymer resin powder was prepared in the same manner as in Comparative Example 1, except that the coagulant was added in an amount of 0.6 parts by weight based on 100 parts by weight of the polymer.

Experimental Example

Moisture contents, apparent specific gravities, particle size distribution, and whiteness of the polymer latex resin powders prepared according to Examples 1 to 5 and Comparative Examples 1 to 5 were measured using the following methods, and measurement results are shown in Table 1 below.

- Moisture content: Changes in weight were measured using a METTLER/TOLEDO HR83-P as a moisture meter until there is no change in weight of the sample (remaining moisture content: 0.5 wt % or less) due to complete evaporation of water.
- Apparent specific gravity: measurement was performed in accordance with ASTM D1985.
- Particle size distribution: A particle diameter of each sample was measured using a standard sieve, and the amount of particles having a size of 1400 μm or more (coarse particles) was measured.
- Whiteness of powder: b values of the polymer latex resin powders were measured using a colorimeter (Color Quest II manufactured by Hunter Lab Co.). The b values may have positive and negative numbers based on 0. In this regard, b values greater than 0 mean yellow, and b values less than 0 mean blue.

TABLE 1

|  | Solid (wt %) | Coagulant (parts by weight) | Moisture content (wt %) | Apparent specific gravity (g/ml) | Amount of coarse particles (%) | Color (b) |
|---|---|---|---|---|---|---|
| Example 1 | 30 | 1.0 | 18.32 | 0.38 | 8.9 | 1.78 |
| Example 2 | 35 | 1.0 | 17.93 | 0.42 | 9.2 | 1.64 |
| Example 3 | 44 | 1.0 | 16.33 | 0.44 | 9.9 | 1.61 |
| Example 4 | 30 | 0.7 | 19.22 | 0.37 | 6.3 | 1.42 |
| Example 5 | 30 | 0.6 | 22.21 | 0.35 | 5.4 | 1.51 |
| Comparative Example 1 | 30 | 1.0 | 26.10 | 0.32 | 16.3 | 2.35 |
| Comparative Example 2 | 35 | 1.0 | 24.85 | 0.34 | 17.2 | 2.24 |
| Comparative Example 3 | 44 | 1.0 | 21.23 | 0.37 | 18.4 | 2.13 |
| Comparative Example 4 | 30 | 0.7 | 34.91 | 0.30 | 15.6 | 2.05 |
| Comparative Example 5 | 30 | 0.6 | 40.33 | 0.28 | 12.77 | 3.11 |

As shown in Table 1, it can be confirmed that, when compared to the polymer latex resin powders of Comparative Examples 1 to 5, the polymer latex resin powders of Examples 1 to 5 prepared using the apparatus according to the present invention had enhanced moisture content and color (b value), increased apparent specific gravity, and a significantly decreased amount of coarse particles, which are particles having an average particle diameter of about 1400 μm or more and may be prepared using a decreased amount of coagulant and, accordingly, color characteristics are enhanced.

Example 6

To examine structural characteristics of the non-continuous screw according to the present invention, moisture content, apparent specific gravity, amount of coarse particles, and color (b values) were measured by varying an area ratio of the openings 214 to the non-continuous screw illustrated in FIG. 2 (e.g., a total area of the openings 214/a total area of the rotary wings 212), and measurement results are shown in Table 2 below. In this regard, the b values were measured using a colorimeter (Color Quest II manufactured by Hunter Lab Co.). In this experiment, the inclination angle α of the rotary wing with respect to an axis perpendicular to the screw shaft was 3.6°.

TABLE 2

| A2/A1 | Moisture content (wt %) | Apparent specific gravity (g/ml) | Amount of coarse particles (%) | Color (b) |
|---|---|---|---|---|
| 1 | 19.63 | 0.37 | 12.51 | 1.85 |
| 0.5 | 18.98 | 0.37 | 10.1 | 1.82 |
| 0.33 | 18.32 | 0.38 | 8.9 | 1.78 |
| 0.2 | 17.56 | 0.4 | 6.5 | 1.71 |
| 0.09 | 18.55 | 0.38 | 7.2 | 1.82 |

As shown in Table 2, it can be confirmed that effects of increasing efficiency of mixing of steam, a latex, and a coagulant by appropriately maintaining a movement rate of the latex within a range within which the area ratio of the openings 214 to the non-continuous screw (i.e., a total area of the openings 214/a total area of the rotary wings) is 0.05 to 1, preferably 0.1 to 0.4, most preferably 0.2 to 0.3, hindering flow of a fluid (e.g., uncondensed steam and latex), and inducing turbulent flow of the latex were excellent.

Example 7

To examine structural characteristics of the non-continuous screw according to the present invention, moisture content, apparent specific gravity, amount of coarse particles, and color (b values) were measured by varying the inclination angle α of the rotary wings with respect to an axis perpendicular to the screw shaft of the non-continuous screw illustrated in FIG. 2, and measurement results are shown in Table 3 below. In this regard, the b values were measured using a colorimeter (Color Quest II manufactured by Hunter Lab Co.). In this experiment, the area ratio of the openings 214 to the non-continuous screw was 0.33.

TABLE 3

| α | Moisture content (wt %) | Apparent specific gravity (g/ml) | Amount of coarse particles (%) | Color (b) |
|---|---|---|---|---|
| 7.2 | 20.78 | 0.36 | 13.44 | 2.01 |
| 3.6 | 18.32 | 0.38 | 8.9 | 1.78 |
| 2 | 16.12 | 0.44 | 5.3 | 1.21 |
| 0.15 | 17.73 | 0.38 | 6.6 | 1.81 |

As shown in Table 3, it can be confirmed that effects of increasing efficiency of mixing of steam, latex, and a coagulant by appropriately maintaining a movement rate of the latex within a range within which the inclination angle α of the rotary wings with respect to an axis perpendicular to the screw shaft of the non-continuous screw is 0.1° to 10°, preferably 0.2° to 4°, most preferably 0.4° to 2°, hindering flow of a fluid (e.g., uncondensed steam and latex), and inducing turbulent flow of the latex were excellent. In particular, it can be confirmed that, as the inclination angle α decreases, i.e., as the inclination angle α approaches 90 degrees with respect to the screw shaft 211, back pressure opposite to a transfer direction is increased and thus induces turbulent flow and, accordingly, the mixing efficiency of the steam, the latex, and the coagulant is enhanced and residence time is secured. Thus, it is important to design the rotary wings by selecting an appropriate slope.

The invention claimed is:

1. An apparatus for preparing a polymer latex resin powder comprising:
- a reactor for coagulation of a polymer latex, in which the reactor comprises a hollow reaction tube through which a latex passes, at least one barrel pin protruding from an inner wall of the reaction tube to an inner side of the reaction tube, a rotating shaft extending along a central axis in a longitudinal direction of the reaction tube, and one or more stirrers protruding from an outer surface of the rotating shaft towards the inner wall of the reaction tube,
- wherein the one or more stirrers comprise a non-continuous screw,
- wherein, in the non-continuous screw, an inclination angle α of a rotary wing with respect to an axis perpendicular to the rotating shaft is 0.1° to 10°, and
- wherein the apparatus comprises at least one of a dehydrator and a dryer.

2. The apparatus according to claim 1, wherein the number of the one or more stirrers is 1 to 20.

3. The apparatus according to claim 1, wherein the non-continuous screw comprises one or more openings.

4. The apparatus according to claim 3, wherein a total area of the one or more openings is in a range of 0.05 to 1 with respect to a total area of rotary wings.

5. The apparatus according to claim 1, wherein the reaction tube of the reactor comprises at least one barrel pin extending from an outside of the reaction tube to an inside of the reaction tube.

6. The apparatus according to claim 1, wherein the reactor comprises a polymer latex introduction line, a coagulant introduction line, and a steam introduction line.

7. The apparatus according to claim 1, wherein the reactor is an integrated reactor for coagulation and aging of the polymer latex.

8. A method of preparing a polymer latex resin powder by using the apparatus according to claim 1.

9. The method according to claim 8, wherein the polymer latex resin powder has a moisture content of 25% or less.

10. The method according to claim 8, wherein a residence time of a polymer slurry in coagulation and aging is 0.5 minutes to 30 minutes.

11. The method according to claim 8, wherein a polymer resin is a graft copolymer of vinyl cyanide compound-conjugated diene-based compound-aromatic vinyl compound.

* * * * *